Nov. 29, 1960 L. H. MORIN 2,961,708
CORE UNITS FOR PRODUCING MOULDED SPOOL BODIES
Filed Feb. 7, 1955 2 Sheets-Sheet 1
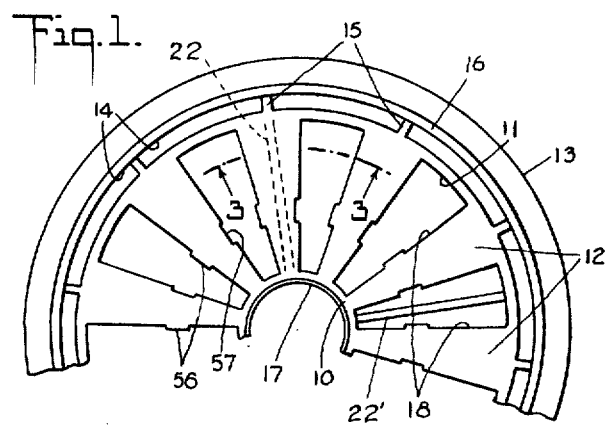
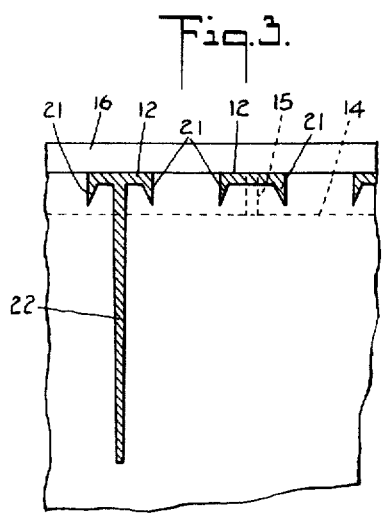
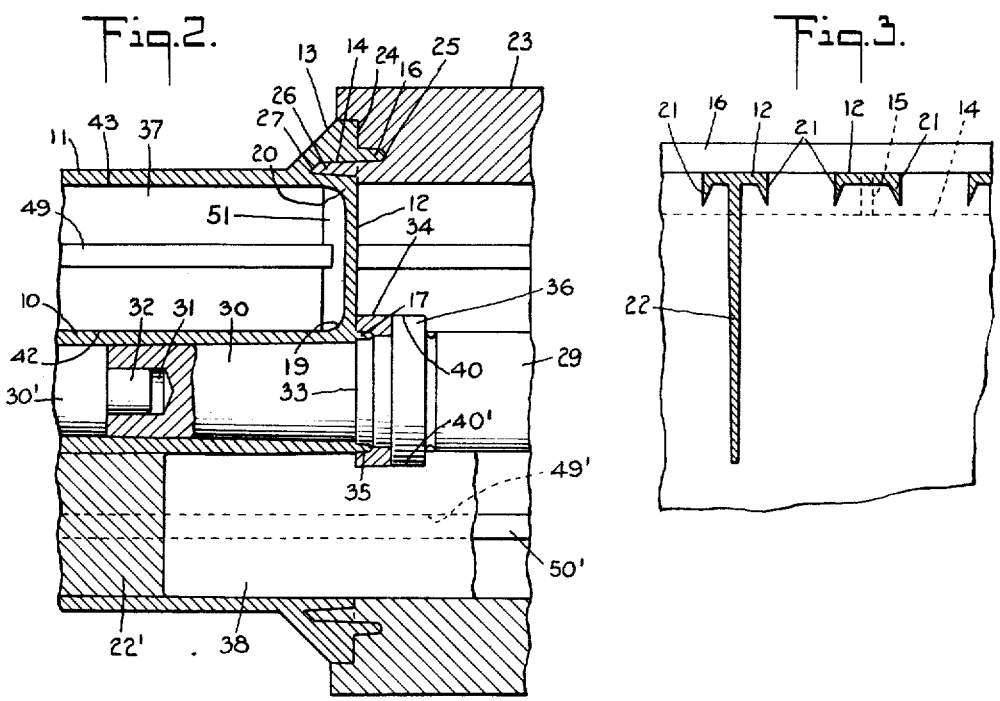
INVENTOR.
LOUIS H. MORIN
BY
ATTORNEY

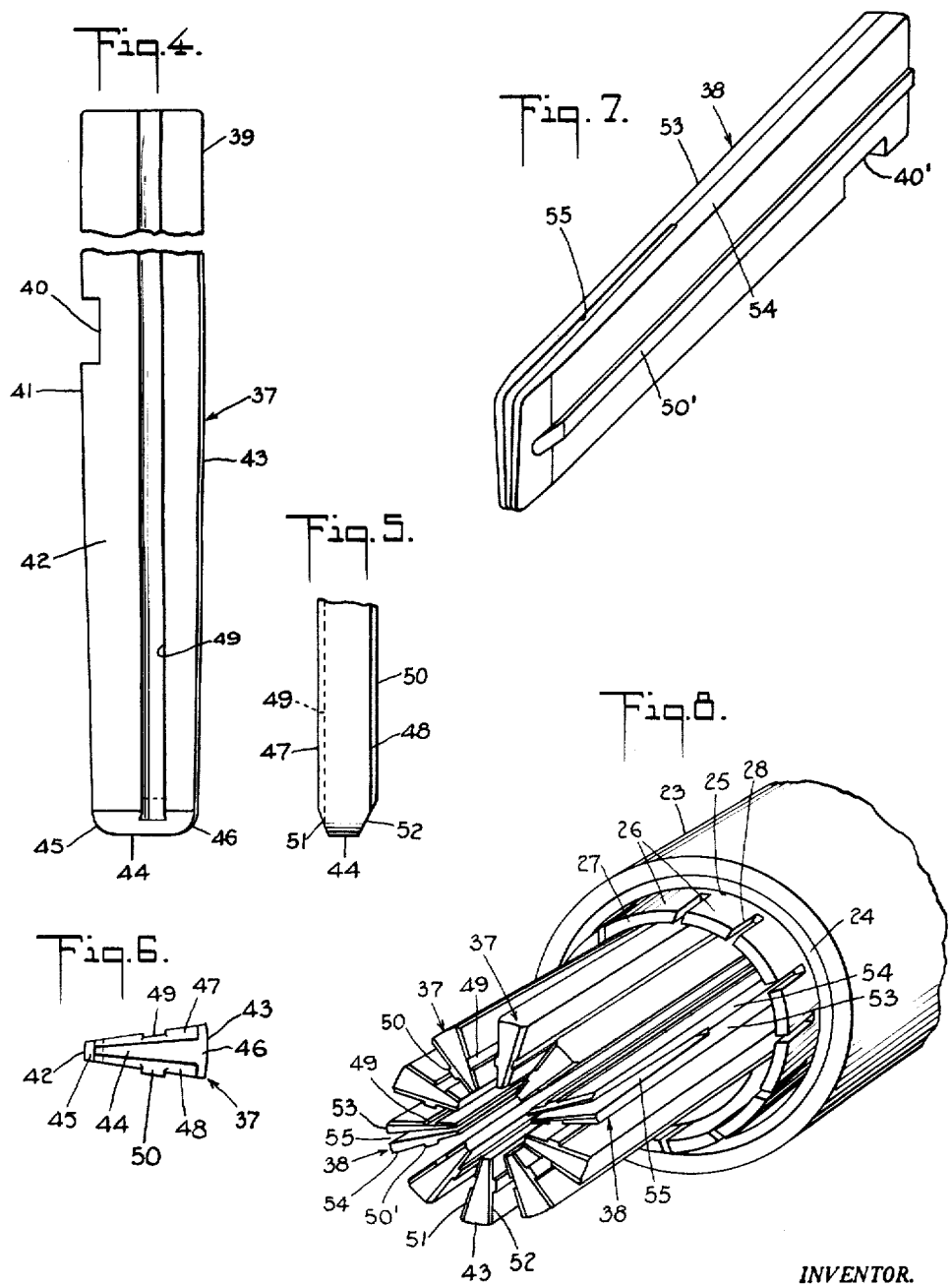

United States Patent Office 2,961,708
Patented Nov. 29, 1960

2,961,708

CORE UNITS FOR PRODUCING MOULDED SPOOL BODIES

Louis H. Morin, Bronx, N.Y., assignor to Coats & Clark, Inc., New York, N.Y., a corporation of Delaware Filed Feb. 7, 1955, Ser. No. 486,664

18 Claims. (Cl. 18—45)

This invention relates to core units for producing moulded spool bodies, wherein the core units are so constructed as to insure easy alinement of the cores and, further, to reinforce predetermined wall structures of the resulting spool body. More particularly, the invention deals with core units including means for reducing the weight of rim end portions of the spool body in forming, on end faces of the rims, annularly arranged openings.

Still more particularly, the invention deals with core units, in which the various elements of the core units are tapered, facilitating said assemblage of the core units, as well as removal from the resulting moulded spool body.

The novel features of the invention will be best understood from the following description, when taken together with the accompanying drawing, in which certain embodiments of the invention are disclosed and, in which, the separate parts are designated by suitable reference characters in each of the views in which:

Fig. 1 is a partial end view of a spool body moulded by the use of my novel core units.

Fig. 2 is a sectional view through portions of two core units, with part of the construction shown in elevation and with parts broken away and diagrammatically showing, in section, one end portion of a spool body, similar to that illustrated in Fig. 1.

Fig. 3 is a diagrammatic sectional view, substantially on the line 3—3 of Fig. 1, illustrating one end portion only of the spool body.

Fig. 4 is a side view of one core element which I employ, with part of the construction broken away.

Fig. 5 is a plan view of one end portion of the core element shown in Fig. 4.

Fig. 6 is an end view of the core element shown in Fig. 4.

Fig. 7 is a perspective view of a modified form of core element, one of a number of which are employed in each core unit; and Fig. 8 is a perspective view, diagrammatically showing one of the assembled core units which I employ, with part of the construction broken away.

This application is a continuation-in-part of my prior applications, Serial Number 363,364, now Patent No. 2,890,490, filed June 22, 1953; Serial Number 442,137, now abandoned, filed July 8, 1954, and Serial Number 442,140, filed July 8, 1954.

In Figs. 1 to 3, inclusive, I have shown portions of a moulded spool body formed by the use of core units made according to my invention and in Fig. 1 is shown a partial end view of a spool body, comprising a center tubular portion 10, an outer barrel portion 11 joining the tubular portion 10 at ends of the spool body by circumferentially spaced spokes or end wall portions 12, said end wall portions and the barrel 11 of the spool body having extended bevelled rims 13, generally of the cross-sectional form clearly illustrated in Fig. 2 of the drawing.

The end walls and rims include circumferentially spaced openings 14 subdivided by spaced ribs 15 positioned substantially in alinement with the center portions of the spokes or end wall members 12, as clearly indicated in Fig. 1 of the drawing. The rims 13 include outwardly extending integral annular flanges 16 which are adapted to be curled-over in securing labels upon the outer surfaces of the spokes or wall portions 12. Extending outwardly from the ends of the tubular portion 10 are other annular flanges 17, which are also adapted to be curled-over in engaging inner portions of labels.

In the construction shown, only one end portion of the spool body is illustrated, it being understood that the other end portion of the body is of similar construction, with the exception that the spokes or end wall members are arranged intermediate the members 12, in other words, in alinement with the openings 18 disposed between the spokes 12.

Considering Fig. 2 of the drawing, it will appear that the end wall members or spokes 12 join the tubular portion 10 and barrel 11 in rounded reinforcing wall portions 19 and 20, respectively. Now considering Fig. 3 of the drawing, it will appear that the end wall members or spokes 12 are further reinforced at their side edges by inwardly extending ribs 21. Predetermined circumferentially spaced end wall members or spokes 12 further include inwardly extending radially arranged tapered ribs 22 which join and reinforce the tubular portion 10 and barrel 11. Some of these ribs extend integrally from one end of the spool body, whereas, other ribs extend integrally from the other end of the spool body. For example, in Fig. 2 of the drawing, a portion of one of the other ribs is indicated at 22' at the left of said figure.

In Fig. 8 of the drawing, I have diagrammatically illustrated in perspective one of the core units which I employ, it being understood that two of these units make up the complete core structure in forming the moulded spool body previously described and, in Fig. 8, 23 represents the base of the core unit in the form of a cylinder, the outer end of which is fashioned to form a groove 24 moulding the outer peripheral portion of the rim 13, as clearly noted in Fig. 2 of the drawing. Inwardly of the groove 24 is a deeper annular groove 25 which forms the projecting flange 16, the walls of the groove 25 being inwardly tapered to a slight extent in order to free the moulded flange 16 in separation of the core.

Inwardly of the groove 25, the base cylinder includes outwardly projecting and tapered circumferentially spaced core elements 26, having bevelled end faces 27, as noted in Fig. 2, the core elements 26 forming the recesses or apertures 14 in the rim ends of the spool body. The spaces 28, between the core elements 26, form the spaced ribs 15, as will be apparent.

Mounted in the center of the base 23 is a shaft or rod 29, having a projecting outwardly tapered core pin 30, the pin 30 having a recess or socket 31 at its free end adapted to receive a projecting pin 32 on the corresponding end of a companion core pin 30' of the opposed core unit. This structure is clearly shown in Fig. 2 of the drawing. The inner or base end of the core pin 30 has an enlarged collar portion 33, which, in conjunction with an annular sleeve 34 mounted on the rod 29, forms a tapered wall, annular groove 35, in which the annular flange 17 is formed. The sleeve 34 seats upon an enlarged annular key portion 36 on the rod 29 which, in combination with the sleeve 34, serves to key a plurality of circumferentially spaced finger-like core elements 37 and 38 on the base 23, or within the cylinder of the base. The elements 37 and 38 are generally of the same construction, with the exception of the fact that the elements 38 are composed of two parts; whereas, the elements 37 are single piece parts. One of the elements 37 is shown in detail, in part, in Figs. 4, 5 and 6; whereas, one of the elements 38 is shown in perspective detail in Fig. 7 of the drawing. In the construction shown, two elements 38 are arranged in opposed relationship to each other on the core unit, as diagrammatically shown in Fig. 8 of the drawing, it being understood that the other companion unit will have, intermediate and substantially at right angles to the elements 38, corresponding opposed elements. Each element 37 is of the same structure. Therefore, the brief description of the one element, illustrated in Figs. 4 to 6, inclusive, will apply to all.

Considering Fig. 4, the end portion 39 of the element 37 may be regarded as the mounting end portion. This end portion includes a key recess 40 on its inner edge 41. Beyond the recess 40, the other end portion 42 of the element 37 has the edge 41, as well as the opposed edge 43 tapered in the direction of the free end 44 of the element. The edge 43 is slightly rounded, as noted in Fig. 6 of the drawing, thus completing the circular contour to the resulting barrel portion of the spool body, as will be apparent from a consideration of Figs. 1 and 2 of the drawing.

The edges 41 and 43 terminate at the end 44 in rounded corner portions, as noted at 45 and 46. These rounded corner portions form the reinforcing walls 19 and 20, respectively, as noted in Fig. 2 of the drawing.

Considering Fig. 6 of the drawing, it will be noted that the side surfaces 47 and 48 of the element 37 taper in the direction of the end 44, the surface 47 having a longitudinal key recess 49, whereas, the surface 48 includes a longitudinal projecting key rib 50, the latter being adapted to cooperate with the recess of an adjacent element of a companion core unit. In other words, considering Fig. 8 of the drawing, it will appear that the companion unit to the unit shown in Fig. 8 includes the core elements which fit between the core elements of the unit shown in Fig. 8 in the interkeyed or interlocking manner described.

The side surfaces 47 and 48 have abrupt tapers at their outer ends, as noted at 51 and 52, respectively. These abrupt tapers or bevels form, on the resulting spool body or the spokes 12 thereof, the reinforcing ribs 21, as clearly noted in Fig. 3 of the drawing.

Keeping in mind the taper of the core elements in the direction of the outer free ends thereof, it will be apparent that, when the two core units are in coupled relationship, the adjacent surfaces of the core elements abut snugly, thus forming the continuous annular surfaces in forming the interior of the barrel 11 and exterior of the tubular portion 10, except, however, for the portions thereof where the ribs 22, 22' are located.

In Fig. 7 of the drawing, I have shown, in perspective, one of the core elements 38. This element differs from the element 37 simply in being formed of two parts 53 and 54, outer ends of these parts being recessed on adjacent surfaces to form the long inwardly tapered or contracted groove or recess 55 which form, on the resulting spool body, the ribs 22, 22'. Aside from this change in structure, the structure of the element 38 is the same as that of the element 37. In other words, at 40' is shown the key recess, similar to the recess 40. 50' represents one of the key ribs which is on the part 54; whereas, the other part 53 includes the key groove or recess, similar to the recess 49 and one of these recesses is indicated, in part, at 49' in Fig. 8 of the drawing. The core element 38 includes all of the tapered features of the element 37 and, for this reason, no further detailed description of the element 38 will be included. In the structure shown, two of the elements 38 are arranged on the core unit shown in Fig. 8 of the drawing in opposed relationship to each other. In assemblage of the companion core unit, the corresponding elements 38 will be arranged substantially at right angles to the elements 38 shown in Fig. 8, thus providing a substantially equal distribution of the ribs 22, 22' circumferentially of the resulting spool body.

At this time, it will be understood that varied numbers of the core elements 38 can be employed in modifying the number of ribs 22, 22' which are employed. It will also be understood that the enlargement 36, as well as the sleeve 34, fits within the key recesses 40, 40' in retaining the core elements in coupled relationship with respect to the base 23, so as to move with the base in separation of the core units after a moulded spool body has been formed. The various tapers provided on the elements 37, 38 as well as on the elements 26 and on the core pins 30, 30', as well as other surfaces previously described, will facilitate free ejection of the moulded product from the core elements.

Considering Fig. 1 of the drawing, it will be apparent that the recesses, at one side of the core elements, for example, the recesses 49, 49', will form, at one side edge of the spokes 12, projecting ribs 56; whereas, the projecting ribs 50, 50' will form, on the opposed edges of said spokes, recesses 57.

In addition to the foregoing, the tapers on the core elements 37 and 48 facilitate coupling engagement of the separated core units in bringing said units into contacting engagement, preparatory to forming the moulded product.

It will be understood that, in assemblage of the core elements 37, 38 on the base 23, suitable spacers are disposed between said elements, which provide the spacing between the adjacent elements in the resulting assemblage, as will be clearly apparent from a consideration of Fig. 8 of the drawing. No specific description of these elements is made, as it is quite apparent from the disclosure that such elements are required in the complete assemblage.

Having fully described my invention, what I claim as new and desire to secure by Letters Patent is:

1. A core structure for moulding spool bodies wherein each spool body comprises a central tubular portion, a barrel having enlarged rim ends, circumferentially spaced spokes at ends of the tubular portion and joining said rim ends, and radial ribs extending longtudinally of and joining said tubular portion and barrel and integral with spaced spokes, said core structure comprising a pair of core units, each unit comprising a base in the form of a cylinder, a plurality of circumferentially spaced elongated core elements mounted in and projecting from said cylinder, means for keying said elements in the cylinder, said means including an outwardly tapered core pin arranged within and spaced from said elements, said elements having wide sides and narrow inner and outer edges, the outer edge being transversely rounded, one side of the element having a longitudinal groove, the other side having a longitudinal rib, and the ribs of the elements of one core unit engaging the grooves of adjacent elements of the other core unit in assemblage of said core units to form the core for said barrel.

2. The core structure of claim 1, in which each core unit includes means for forming outwardly projecting annular flanges on the ends of the spool body.

3. The core structure of claim 1, in which each core unit includes means for forming circumferentially spaced recesses and ribs on said rims.

4. The core structure of claim 1, in which ends of the edges of the core elements are rounded to form reinforcing wall portions joining the spokes with the tubular portion and barrel.

5. The core structure of claim 1, in which ends of the wide sides of the core element are bevelled to form inwardly extending reinforcing ribs at sides of said spokes.

6. The core structure of claim 1, in which predetermined circumferentially spaced core elements include tapered grooves extending through ends of said elements to form the radial ribs of the spool body.

7. A core unit for use in moulding hollow spool bodies, said core unit comprising a base, said base including annularly arranged outwardly tapered projections for forming circumferentially spaced openings in an end face of a moulded spool body, the base, outwardly of said projections, having an annular groove forming, on the end face of the spool body, an annular projecting flange, circumferentially arranged core elements extending from the base inwardly of said projections, each element being tapered longitudinally in the direction of its free end, the free end of each element being bevelled across its width, predetermined circumferentially spaced elements of the core unit being formed of two pieces and having tapered recesses opening outwardly through the free ends thereof, and the base including a central core pin spaced with respect to said elements and being tapered toward its free end.

8. A core unit for use in moulding hollow spool bodies, said core unit comprising a base, said base including annularly arranged outwardly tapered projections for forming circumferentially spaced openings in an end face of a moulded spool body, the base, outwardly of said projections, having an annular groove forming, on the end face of the spool body, an annular projecting flange, circumferentially arranged core elements extending from the base inwardly of said projections, each element being tapered longitudinally in the direction of its free end, the free end of each element being bevelled across its width, predetermined circumferentially spaced elements of the core unit being formed of two pieces and having tapered recesses opening outwardly through the free ends thereof, the base including a central core pin spaced with respect to said elements and being tapered toward its free end, and means including said core pin for keying all of said elements within the base.

9. A core unit for use in moulding hollow spool bodies, said core unit comprising a base, said base including annularly arranged outwardly tapered projections for forming circumferentially spaced openings in an end face of a moulded spool body, the base, outwardly of said projections, having an annular groove forming, on the end face of the spool body, an annular projecting flange, circumferentially arranged core elements extending from the base inwardly of said projections, each element being tapered longitudinally in the direction of its free end, the free end of each element being bevelled across its width, predetermined circumferentially spaced elements of the core unit being formed of two pieces and having tapered recesses opening outwardly through the free ends thereof, the base including a central core pin spaced with respect to said elements and being tapered toward its free end, means including said core pin for keying all of said elements within the base, each of said core elements having, at one side, a longitudinal key recess and, on the opposed side, a longitudinal key rib, and free ends of the elements having rounded upper and lower corner portions.

10. A core structure for moulding hollowed cored spool bodies, said structure comprising a pair of similar, oppositely disposed core units adapted for endwise movement toward and away from one another, each core unit comprising a base having projecting circumferentially spaced outwardly tapered core elements adapted to interfit with corresponding core elements of the companion unit in coring a spool body, each core element of one unit having a free end adapted to engage and move into a space between a pair of adjacent elements on the companion unit during said endwise movement of the units, means on each element for keying the elements of one unit with the elements of the companion unit substantially throughout the interfitting length of said elements, and the free end portion of each element having rounded and bevelled surfaces for facilitating the interfitting movement of the elements.

11. The core structure of claim 10 wherein at least one of the circumferentially spaced core elements of each core unit has an elongated tapered recess opening through the free end thereof.

12. The core structure of claim 10 wherein each core unit has within and spaced from said core elements, an outwardly extending and tapered core pin, and means for keying and alining adjacent end portions of the core pins of both units.

13. The core structure of claim 10 wherein said structure has means for keying the core elements in the base, and said base having, outwardly of and spaced from the core elements, other circumferentially spaced core elements.

14. In core units for moulding plastic spool bodies of the character described, an elongated core element for use therein, said element having opposed lateral sides, upper and lower sides, a free end portion, and an opposite end portion for mounting the element, said element, when viewed in lateral side elevation, being tapered from the mounting end portion to the free end portion thereof, said upper and lower sides being of different widths, said upper side being curved transversely thereof, said free end portion terminating in an end face having opposite lateral edges that are bevelled and rounded upper and lower edges, and each said lateral side having means for engaging a lateral side of an oppositely disposed core element.

15. The core element of claim 14 wherein said element comprises two mating parts formed by a plane passing centrally through upper and lower sides of the element and throughout the length thereof, each part having a recess in the free end portion thereof which extends across a lateral side of the same, said recesses forming in said mating parts a groove which opens through said end face and said upper and lower sides of the element, and said groove being progressively narrowed in the direction of the mounting end portion of the element.

16. A core unit for use in moulding hollow spool bodies, said core unit comprising a base, said base having circumferentially spaced, outwardly tapered projections, a plurality of circumferentially arranged core elements extending from the base and disposed inwardly of said projections, each element being tapered longitudinally in the direction of the free end thereof, each element, when viewed in transverse cross section, being tapered from the outer to the inner sides thereof, the free end of each element terminating in an end face having opposite lateral edges that are bevelled, some of said core elements each having a recess opening outwardly through the free end portion thereof, said recess tapering in the direction of said base, and said base having a central core pin spaced inwardly with respect to said elements and being tapered toward the free end thereof.

17. A core unit for use in moulding hollow spool bodies, said core unit comprising a base, said base having circumferentially spaced projections, a plurality of circumferentially arranged core elements extending from the base and disposed inwardly of said projections, each element being tapered longitudinally in the direction of the free end thereof, each element, when viewed in transverse cross section, being tapered from the outer to the inner sides thereof, the free end of each element terminating in an end face having opposite lateral edges that are bevelled, some of said core elements each having a recess opening outwardly through the free end portion thereof, said recess tapering in the direction of said base.

18. A pair of oppositely disposed, interengageable core units for use in moulding hollow spool bodies, each said unit comprising a base having a plurality of circumferentially spaced core elements extending therefrom, each element being tapered longitudinally in the direction of the free end thereof, said free end of each element terminating in an end face having opposite lateral edges that are bevelled and rounded upper and lower edges, said base having a central core pin spaced radially inwardly with respect to said elements and being tapered toward the free end thereof, each element of one unit being adapted to engage endwise thereof and to interfit between a pair of adjacent elements of the other unit to form a core assembly for moulding a spool body, and the free end of the core pin of one unit abutting that of the other unit in said core assembly.

References Cited in the file of this patent

UNITED STATES PATENTS

| | | |
|---|---|---|
| 481,952 | Ingram | Sept. 6, 1892 |
| 806,763 | Dayton | Dec. 12, 1905 |
| 1,307,283 | Webb | June 17, 1919 |
| 2,244,119 | Samerdyke | June 3, 1941 |
| 2,266,887 | McCoy | Dec. 23, 1941 |
| 2,272,233 | Walters | Feb. 10, 1942 |

FOREIGN PATENTS

| | | |
|---|---|---|
| 477,204 | Great Britain | Dec. 23, 1937 |